United States Patent [19]

Tsuji et al.

[11] Patent Number: 5,056,076

[45] Date of Patent: Oct. 8, 1991

[54] METHOD FOR CONTROLLING THE ROTATIONAL VELOCITY OF AN INFORMATION RECORDING DISK

[75] Inventors: Kentaroh Tsuji, Nara; Hiroshi Fuji; Tomiyuki Numata; Tsuneo Fujiwara; Shigeo Terashima, all of Tenri, all of Japan

[73] Assignee: Sharp Kabushiki Kaisha, Osaka, Japan

[21] Appl. No.: 508,538

[22] Filed: Apr. 10, 1990

Related U.S. Application Data

[63] Continuation of Ser. No. 125,413, Nov. 25, 1987, abandoned.

[30] Foreign Application Priority Data

Nov. 27, 1986 [JP] Japan .................................. 61-283198

[51] Int. Cl.⁵ .......................... G11B 5/09; G11B 15/52; G11B 20/10; G11B 27/22
[52] U.S. Cl. ...................................... 369/50; 369/189; 369/277
[58] Field of Search ........................... 369/50, 189, 277

[56] References Cited

U.S. PATENT DOCUMENTS

4,006,292  2/1977  Schaefer .............................. 369/277

FOREIGN PATENT DOCUMENTS

0123946  11/1984  European Pat. Off. .
2085199   4/1982  United Kingdom .

OTHER PUBLICATIONS

Patent Abstracts of Japan, vol. 9, No. 13 (P-328)(1736), Jan. 19, 1985; and JP-A-59 160 866 (Pioneer K.K.) 11-09-1984.
Bulthuls et al., (Aug. 1979), IEEE, pp. 26-33.

*Primary Examiner*—William L. Sikes
*Attorney, Agent, or Firm*—Irell & Manella

[57] ABSTRACT

A method of controlling the rotational velocity of an information recording disk having one or more tracks in which patterns and marks are formed, the marks including at least one specific pattern having a predetermined length, which method comprises: measuring a time during which each of the patterns passes; detecting each of the marks on the basis of the values of the measured times; and controlling the rotational velocity of the disk on the basis of the measured time of the specific pattern of the detected mark, thereby making the linear velocity of the detected mark constant.

12 Claims, 2 Drawing Sheets

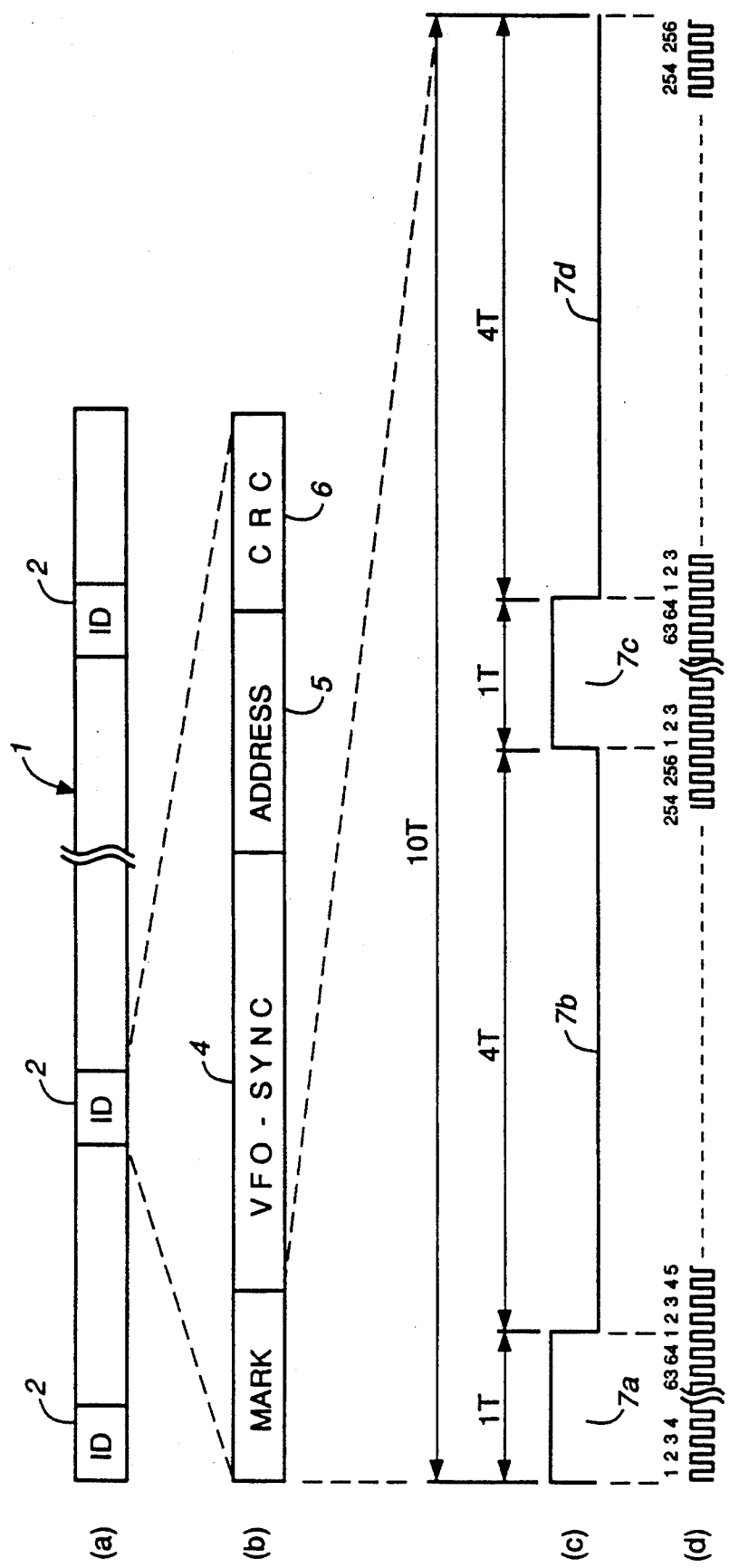
FIG._1

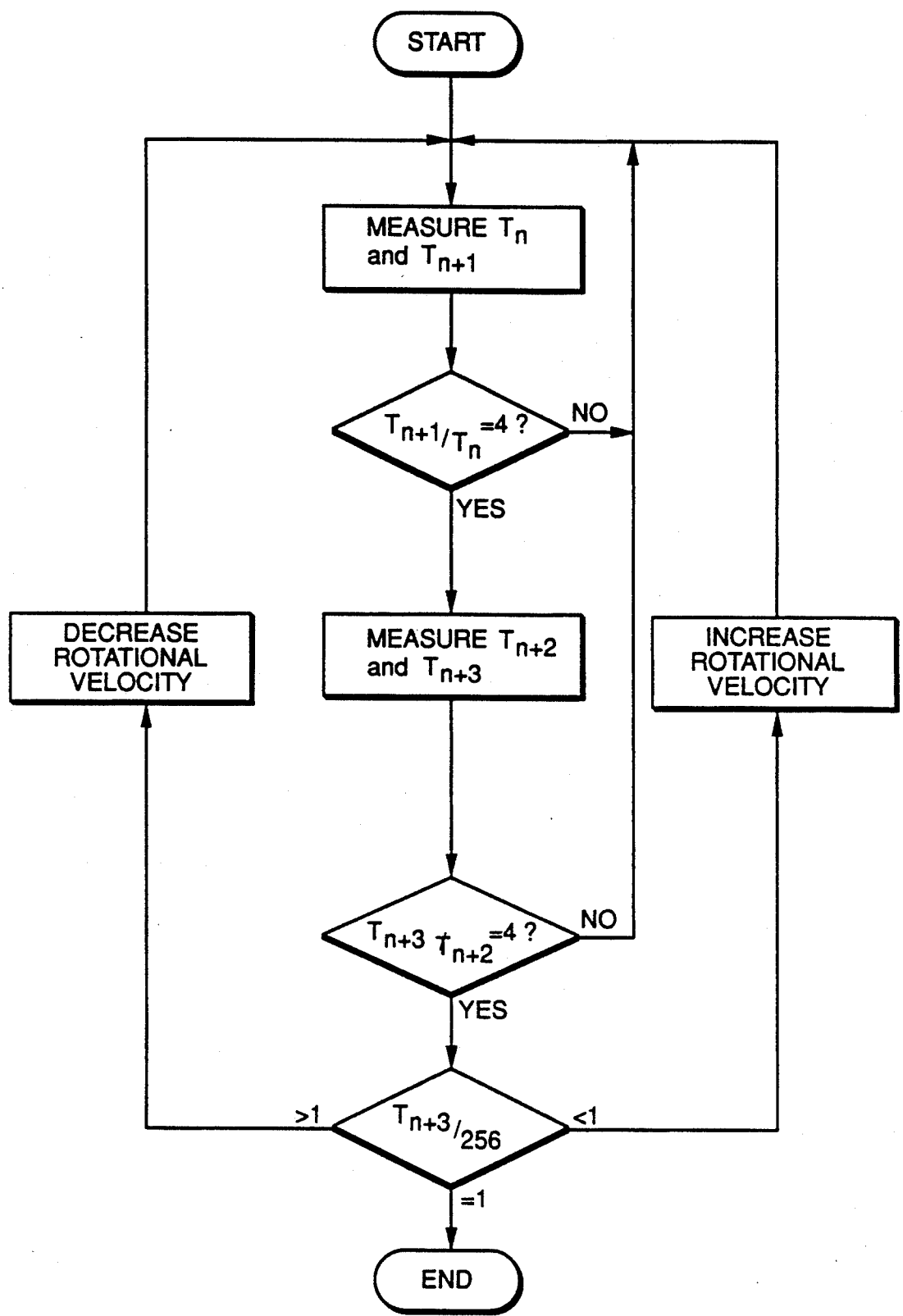
FIG._2

METHOD FOR CONTROLLING THE ROTATIONAL VELOCITY OF AN INFORMATION RECORDING DISK

This application is a continuation of application Ser. No. 125,413, filed Nov. 25, 1987, now abandoned.

BACKGROUND OF THE INVENTION

1. Field of the Invention

This invention relates to a method of controlling the rotational velocity of an information recording disk, more particularly, it relates to a method of controlling an information recording disk having one or more tracks which are concentric or spiral and in which information is recorded and/or reproduced, for example, by a laser beam. This invention also relates to an information recording disk such as an optical or optical magnetic disk which is useful in performing the method.

2. Description of the Prior Art

Generally, when information or data are recorded into, reproduced or erased from an information recording disk in terms of bit patterns formed in tracks of the disk by a reading/recording apparatus, the rotational velocity of the disk is kept constant. When the rotational velocity of a disk is to be kept constant, however, the length of a pattern corresponding to one bit (hereinafter referred to as "bit length") which is formed on the outer periphery of the disk must be longer than the bit length which is formed on the inner periphery, resulting in a low recording density on the outer periphery despite a high recording density on the inner periphery to cause a problem of a reduced recording density of the disk as a whole.

This problem can be solved by controlling the linear velocity of a disk so as to be constant. However, this technique involves a drawback which will be described. When this technique is to be conducted, the absolute position of a device for reading data (hereinafter referred to as "pickup") in the radial direction of the disk must be accurately known. Usually, the information about this absolute position (hereinafter referred to as "position information") is previously recorded in an address part. When any process such as recording is conducted onto a track of a disk, the pickup of a reading/recording apparatus is accessed to the track to be processed, and then the address information must be read out from the address part formed in the track to confirm whether the pickup has been accurately addressed to the objective track or not. In order to read the address information accurately, the disk should be rotated at a velocity which corresponds to the position of the pickup. In other words, the address part having the address information to be read out should move relative to the pickup at a fixed linear velocity. For this purpose, the following conditions are required:

(1) When the address information is read out, the disk rotates at a velocity which corresponds to the position of the address information in the radial direction.

(2) The address information is read out to control the rotational velocity of the disk.

These conditions (1) and (2) conflict with each other, resulting in that, conventionally, it has been difficult to perform the recording, reproduction, or erasure of information at a constant linear velocity.

SUMMARY OF THE INVENTION

Thus, the invention described herein makes possible the objects of:

(1) providing a method which can accurately and easily control the rotational velocity of an information recording disk, thereby enabling any address part which is to be addressed by a pickup to rotate at a predetermined linear velocity;

(2) providing a method which can accurately and easily control the rotational velocity of an information recording disk having a uniform bit length over the whole of the disk, thereby enabling the increase of the recording capacity of the disk;

(3) providing a method which can accurately and easily control the rotational velocity of an information disk having no position information in address parts, thereby enabling the reduction of the length of the address parts;

(4) providing an information recording disk which can be accurately and easily controlled so as to rotate at a fixed linear velocity regarding any address part, thereby enabling the recording, reproduction or erasure of information at a fixed linear velocity;

(5) providing an information recording disk which has a constant bit length over the whole, resulting in an enlarged recording capacity of the disk;

(6) providing an information recording disk which can eliminate the necessity of providing address parts with their position information, thereby reducing the length of the address parts.

BRIEF DESCRIPTION OF THE DRAWINGS

This invention may be better understood and its numerous objects and advantages will become apparent to those skilled in the art by reference to the accompanying drawings as follows:

FIG. 1(a) is a diagram showing the record format of a track of an information recording disk of this invention.

FIG. 1(b) is a diagram showing the pattern of the ID portion of the track shown in FIG. 1(a).

FIG. 1(c) is a diagram showing the bit pattern of the mark of the ID portion shown in FIG. 1(b).

FIG. 1(d) is a diagram showing clock pulses.

FIG. 2 is a flow chart illustrating the method of this invention.

DESCRIPTION OF THE PREFERRED EMBODIMENTS

FIG. 1 shows the record format of a track of a preferred example of the information recording disk according to the invention. In the disk which is an optical magnetic disk having concentric tracks, a track 1 has a plurality of ID portions 2 (FIG. 1(a)). The ID portions 2 are preferably separated from each other along the track 1 with a fixed distance. As shown in FIG. 1(b), each ID portion 2 comprises a mark 3 indicating the head of the ID portion 2, a VFO-SYNC area 4 for operating a PLL circuit to obtain synchronizing pulses, an address area 5 showing the address data of the ID portion 2, and a CRC (Cyclic Redundancy Check) area 6 for detecting a bit error in the readout address data. In the preferred embodiment, the ID portions 2 are preformed into a concave-convex shape when manufacturing the disk. Accordingly, it is possible that data are recorded in, reproduced from or erased from the ID portions 2, but impossible to erase the ID portions 2 themselves.

One example of the bit pattern of the mark 3 (hereinafter referred to as "mark pattern") is shown in FIG. 1(c). In this example, the mark pattern consists of a sequence of a first convex portion 7a having a length of 1T (T shows a bit length), a first concave portion 7b having a length of 4T, a second convex portion 7c having a length of 1T, and a second concave portion 7d having a length of 4T. The mark pattern is not restricted to the above-mentioned one, but can be formed into any suitable pattern arrangement. However, it is preferable to select the mark pattern so as not to be a pattern which may appear in the data pattern to be recorded.

In the preferred embodiment, the interval during which each pattern passes is measured in terms of a number of clock pulses by a technique well-known in the field. More specifically, the number of clock pulses is counted during the time required for each of the patterns 7a to 7d to pass the pickup of a recording/reproducing apparatus. In the description of the embodiment, the word "interval" means a time interval between the time when the front edge of a pattern passes the pickup and the time when the rear edge of the pattern passes the pickup. The frequency of the clock has a frequency which is 64 times of the bit rate. Namely, when the mark 3 moves at a predetermined linear velocity $V_L$, the interval of the pattern 7a or 7c corresponds to 64 clock pulses.

When information is to be recorded onto one of the tracks 1 of a disk rotating at an arbitrary velocity, the pickup is moved by a known technique to a track positioned near the objective track. Then, the interval of each pattern in the track is measured in terms of a number of clock pulses. When the marks or patterns of the track rotate at the predetermined linear velocity $V_L$, the measured intervals are 64 pulses for the patterns (1T-patterns) 7a and 7c, and 256 pulses for the patterns (4T-patterns) 7b and 7d. When the marks or patterns rotate at twice the predetermined linear velocity (2 $V_L$), the measured intervals are 32 pulses for the 1T-patterns, and 128 pulses for the 4T-patterns. When the marks or patterns rotate at half that velocity (0.5 $V_L$), the measured intervals are 128 pulses for the 1T-patterns, and 512 pulses for the 4T-patterns. Accordingly, when the ratio of the measured interval $T_n$ of a first pattern and the measured interval $T_{n+1}$ of a second pattern which is successive to the first pattern, (i.e., $T_{n+1}/T_n$) equals 4, it can be decided that the two patterns belong to any one of the marks 3, irrespective of the linear velocity of the mark or the rotational velocity of the disk. If the ratio of the intervals of two successive patterns is not 4, the intervals of the following two successive patterns are measured and their ratio is calculated until the resulting ratio of intervals of 4 is obtained.

As mentioned above and shown in FIG. 1(c), the embodiment has a series of the 1T-pattern 7a, 4T-pattern 7b, 1T-pattern 7c and 4T-pattern 7d in the mark 3, and, therefore, the ratio of the measured interval ($T_{n+2}$) of a third pattern which is successive to the second pattern and the measured interval ($T_{n+3}$) of a fourth pattern (i.e., $T_{n+3}/T_{n+2}$) is also calculated, and it can be decided that the patterns belong to any one of the marks 3 when the resulting ratio of 4 is obtained twice consecutively.

After one of the marks 3 is detected in this way, the measured interval ($T_{n+3}$) of the fourth pattern (4T-pattern) 7d is divided by 256 which equals to the interval of the fourth pattern 7d measured when the fourth pattern 7d moves at the predetermined linear velocity $V_L$. Namely, the ratio $T_{n+3}/256$ is calculated. The linear velocity of the measured mark 3 can be obtained by multiplying the value obtained from the above calculation by the predetermined linear velocity $V_L$. The disk driving device (not shown) is controlled so that the linear velocity of the mark 3 becomes the predetermined linear velocity $V_L$. More specifically, the rotational velocity of the disk is decreased when the ratio $T_{n+3}/256$ is smaller than 1, and the rotational velocity is increased when the ratio $T_{n+3}/256$ is greater than 1. The above processes are repeated until the track 1 or the mark 3 rotates at the predetermined linear velocity $V_L$. FIG. 2 shows a flow chart of these processes.

Then, the address data of the address portion 4 are read out to confirm whether or not the mark 3 or ID portion 2 belongs to the objective portion into which the information is to be recorded. When the readout data are objective ones, the information to be recorded is recorded, and when the data are not objective ones, the pickup is moved onto another track, and the above-mentioned procedures are repeated.

The arrangement of the mark pattern is not restricted to the above-mentioned one. The reliability of the control can be improved by increasing the length of the pattern of the mark 3, for example, from the 10-bit length to the 15-bit or 20-bit length. Further, the number of clock pulses corresponding to the interval to be detected can be selected to any suitable one. When the number of clock pulses corresponding to the 1T-pattern is selected to be 128, for example, a control of rotational velocity with a very high accuracy of 1% or less of error in the velocity can be achieved.

According to the present invention, the rotative velocity of an information recording disk can be accurately and easily controlled so that the recording, reproduction, or erasure of information can be conducted at a constant linear velocity. According to the invention, a bit length of patterns in a disk can be uniform over the whole of the disk, resulting in an increased recording capacity by 50% or more as compared with conventional information recording disks of constant rotational velocity type. In the information recording disk of the invention, it is not necessary to pre-record the information of the absolute position of the ID part in the radial direction of the disk (position information), into the address portion. Hence, the length of the address portions can be decreased.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method of controlling the rotational velocity of an information recording disk having one or more tracks in which patterns and marks are formed, said marks including at least one specific pattern having a predetermined length, comprising the steps of:

measuring at least one time interval during which each of said patterns and said marks passes;

determining whether each of said patterns and said marks to which the measured time interval relates matches at least one said specific pattern of said marks, and if so, comparing said measured time interval with a predetermined time interval; and controlling the rotational velocity of the disk on the basis of said comparison, such that a succeeding time interval after said measured time interval is substantially equal to said predetermined time interval, for making the linear velocity of said detected mark constant.

2. A method of controlling the rotational velocity of an information recording disk according to claim 1, wherein each said mark includes at least a first set of patterns including a first specific pattern and a second specific pattern, said first and second patterns having lengths which are different from one another, wherein said measuring step includes the steps of:

measuring a first specific time interval during which the first specific pattern passes;

measuring a second specific time interval during which the second specific pattern passes;

and wherein said determining step includes the step of:

generating a first ratio of the second time interval to the first time interval; and comparing the first ratio with a predetermined ratio.

3. A method of controlling the rotational velocity of an information recording disk according to claim 2, wherein each of said marks further includes a second set of said first and second specific patterns, said first and second sets being successively formed, wherein said measuring step further includes the steps of:

measuring a third specific time interval during which the first specific pattern of said second set passes;

measuring a fourth specific time interval during which the second specific pattern of said second set passes;

and wherein said determining step further includes the steps of:

generating a second ratio of the fourth time interval to the third time interval; and comparing the second ratio with said predetermined ratio, for determining when said predetermined ratio is successively generated at least twice.

4. A method of controlling the rotational velocity of an information recording disk according to claim 3, wherein the second specific pattern has a longer length than the first specific pattern, and wherein the step of controlling the rotational velocity of the disk includes the step of comparing said second specific time interval with said predetermined time interval.

5. A method of controlling the rotational velocity of an information recording disk according to claim 4, wherein the step of controlling the rotational velocity of the disk includes the step of taking a ratio of a predetermined value to the second specific time interval.

6. A method of controlling the rotational velocity of an information recording disk according to claim 2, wherein the second specific pattern has a longer length than the first specific pattern, and wherein the step of controlling the rotational velocity of the disk includes the step of comparing said second specific time interval with said predetermined time interval.

7. A method of controlling the rotational velocity of an information recording disk according to claim 6, wherein the step of controlling the rotational velocity of the disk includes the step of taking a ratio of a predetermined value to the second specific time interval.

8. An information recording disk having one or more tracks, wherein a plurality of marks are formed in said tracks, each said mark including at least a first set of patterns including a first specific pattern and a second specific pattern wherein each said pattern has a predetermined length, and wherein two patterns within a given mark are a fixed distance apart, the ratio of the length of said first specific pattern to the length of said second specific pattern being constant.

9. An information recording disk according to claim 8, wherein said marks are formed at fixed intervals along said tracks.

10. An information recording disk according to claim 8, wherein said marks include two or more kinds of specific patterns.

11. An information recording disk according to claim 10, wherein said marks include two sets of said two or more kinds of specific patterns.

12. An information recording disk according to claim 11, wherein said two sets of said two or more kinds of specific patterns are successively formed along said tracks.

* * * * *

UNITED STATES PATENT AND TRADEMARK OFFICE
CERTIFICATE OF CORRECTION

PATENT NO. : 5,056,076

DATED : October 8, 1991

INVENTOR(S) : Kentaroh Tsuji, et al

It is certified that error appears in the above-identified patent and that said Letters Patent is hereby corrected as shown below:

Column 3, line 63, In Figure 2 that part of the flowchart:

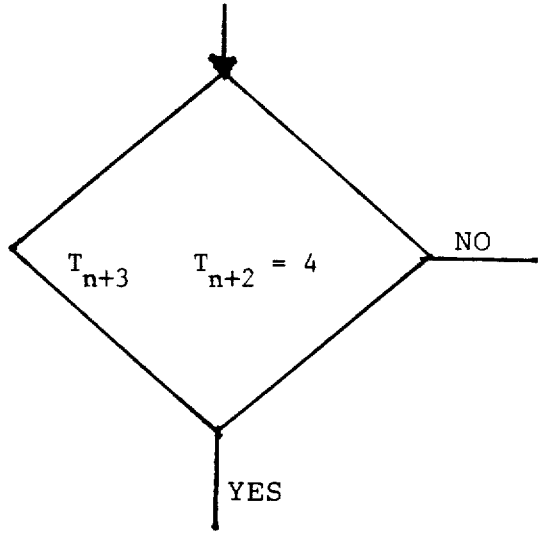

UNITED STATES PATENT AND TRADEMARK OFFICE
CERTIFICATE OF CORRECTION

PATENT NO. : 5,056,076

DATED : October 8, 1991

INVENTOR(S) : Kentaroh Tsuji, et al

It is certified that error appears in the above-identified patent and that said Letters Patent is hereby corrected as shown below:

should read

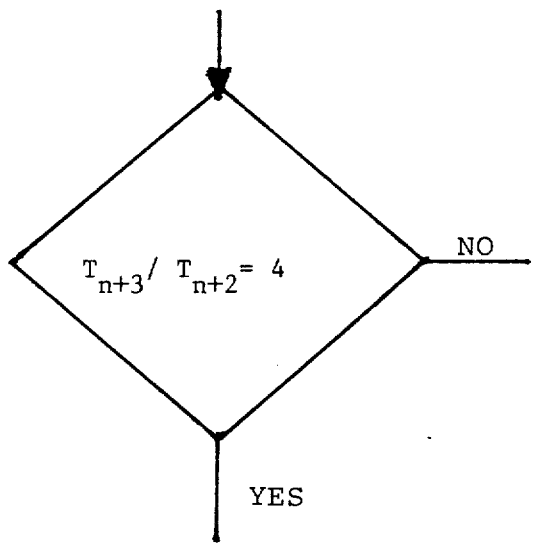

Signed and Sealed this

Thirtieth Day of March, 1993

*Attest:*

STEPHEN G. KUNIN

*Attesting Officer*     *Acting Commissioner of Patents and Trademarks*